UNITED STATES PATENT OFFICE.

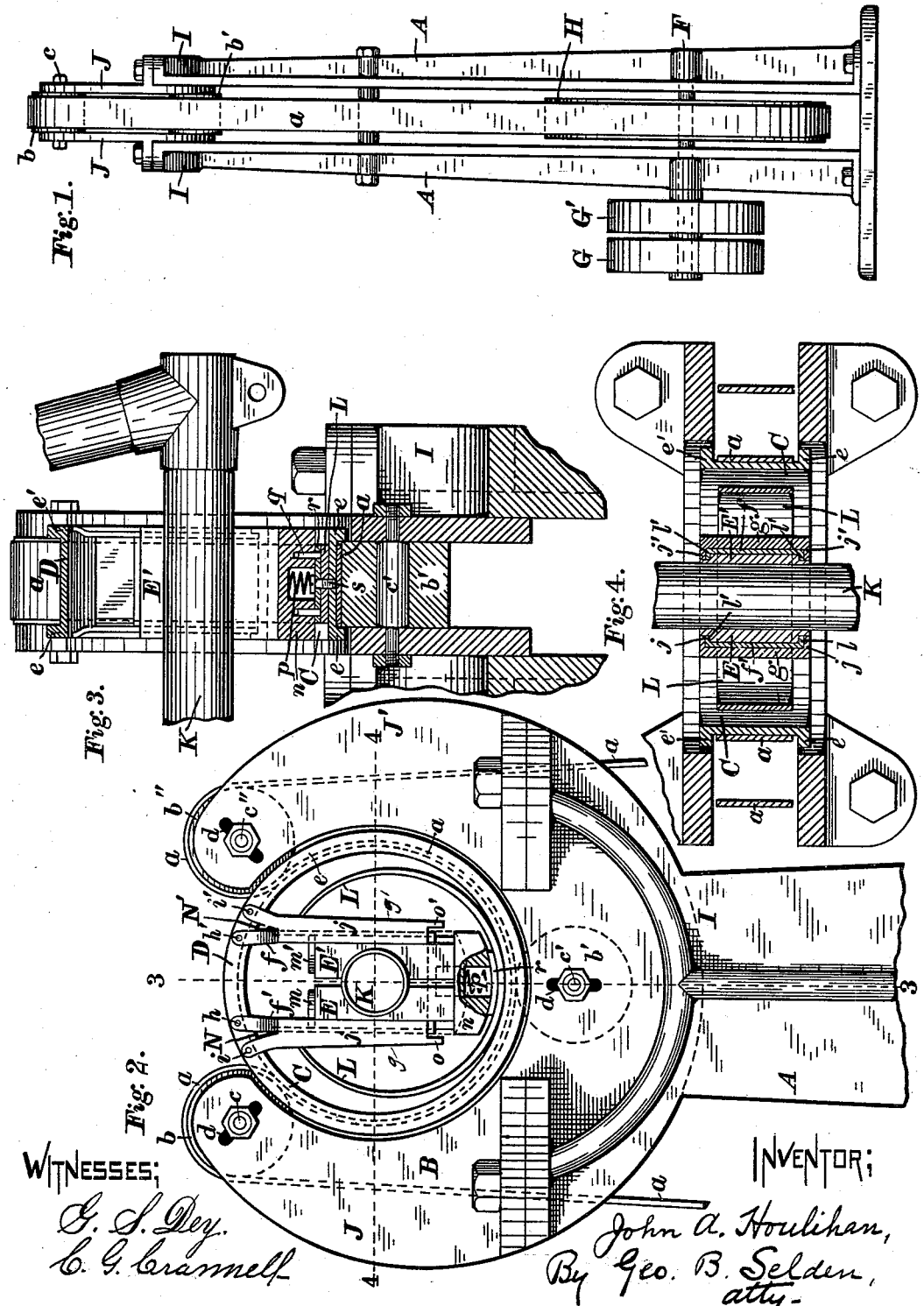

JOHN A. HOULIHAN, OF ROCHESTER, NEW YORK, ASSIGNOR TO ANNIE H. HOULIHAN, OF SAME PLACE.

POLISHING-MACHINE.

SPECIFICATION forming part of Letters Patent No. 585,034, dated June 22, 1897.

Application filed January 28, 1897. Serial No. 621,059. (No model.)

*To all whom it may concern:*

Be it known that I, JOHN A. HOULIHAN, a citizen of the United States, residing at Rochester, in the county of Monroe, in the State of New York, have invented certain Improvements in Polishing-Machines, of which the following is a specification, reference being had to the accompanying drawings.

My invention relates to certain improvements in polishing-machines designed more particularly for cleaning, polishing, and burnishing bicycle-frames, but capable of application for other similar purposes.

My invention is fully described and illustrated in the following specification and accompanying drawings, and the novel features thereof specified in the claims annexed to the said specification.

In the accompanying drawings, representing my improved polishing-machine, Figure 1 is a side elevation. Fig. 2 is a side elevation of the head of the machine, on an enlarged scale, taken at right angles to Fig. 1. Fig. 3 is a central vertical section of the revolving polishing-pulley on the line 3 3, Fig. 2. Fig. 4 is a horizontal section of the same on the line 4 4, Fig. 2.

In order to clean, polish, or burnish bicycle-frames or other tubular structures, I employ a revolving wheel or pulley provided with a removable segment carrying the cleaning or polishing surfaces so arranged that the segment can be readily removed to permit the introduction of the frames or other structures, so that they may be subjected to the operation. The wheel or pulley requires to be driven and supported during the operation and the active cleaning or polishing surfaces to be pressed together upon the work while revolving in contact with it. For these purposes I have devised the following construction:

A is an upright standard supporting the pulley C, which is provided with a removable segment D, carrying the polishing devices E E'. The pulley is supported and driven by the belt $a$, which travels around the rolls $b$ $b''$ and encircles the pulley from one of these rolls to the other. The roll $b'$ at the lower side of the pulley supports it and holds the belt $a$ in contact with it. The frame A is provided with the counter-shaft F, provided with tight and loose pulleys G G' and the pulley H, which drives the belt $a$. The pulley C revolves without support other than that furnished by the belt $a$ and the three pulleys $b$ $b'$ $b''$, although the head B is preferably so shaped as to retain the pulley in position in case of unusual or unexpected deviations from a true revolution. The standard A, which is preferably made double, as shown, and terminates at its upper end with a suitable divided yoke I, to which the curved arms J J' of the head B are secured in any suitable manner. The roll $b$ is supported between the arms J J by the stud $c$, provided with nuts at each end or otherwise suitably secured and passing through slots $d$, Fig. 2, which permit of the adjustment of the roll to and from the pulley. This adjustment is particularly useful in fitting belts of different thicknesses to the machine. The roll $b'$ is similarly supported by the stud $c'$ and the roll $b''$ by the stud $c''$. As shown in Fig. 3, these studs are shouldered at each end, and the nuts on their ends draw the parts of the heads firmly in place.

The pulley C is provided with the flanges $e$ $e'$, which project over the sides of the rolls $b$ $b'$ $b''$, and serve to secure the pulley against lateral displacement. The belt $a$ intervenes between the surface of the pulley and the rolls, and the pulley is sustained and driven by the belt without other support under normal conditions. The relative positions of the rolls may be varied under certain conditions consistent with the support of the pulley by the belt wrapped about rather more than half of the circumference of the pulley.

K represents a portion of the bicycle-frame to be cleaned, ground, polished, or burnished, and which occupies a central position in the revolving pulley, while being free to be shifted lengthwise while the machine is acting on its surface. In order to permit the introduction of the article to be polished inside the pulley, I provide the removable segment D, which carries the polishing devices E E' and is arranged so that it may be removed from the pulley with the polishing devices, which are made separable, so that the article can be placed between them, and in order to secure the requisite pressure of the polishing devices on the rod, tube, frame, or other article I employ a spring L within the pulley. The polishing devices are carried by the clamp-plates $ff'$, which are pivoted to the removable segment D by ears at $h\ h'$, Fig. 2, on both sides and slide within the clamps $g\ g'$, which are pivoted to the pulley C at $i\ i'$ and are thrust inward by the spring L. At their edges the clamps $g\ g'$ are provided with the inwardly-projecting flanges $j\ j'$, Figs. 2 and 4, which embrace the clamp-plates $ff'$ and sustain them against lateral thrusts. The clamp-plates $ff'$ are similarly provided with internally-projecting flanges $l\ l'$, Fig. 4, which embrace and sustain the polishing-blocks or other devices. It will thus be understood that the segment D, carrying the clamp-plates $ff'$, can be readily removed or reintroduced into the pulley C, being arranged to slide freely within the clamps $g\ g'$. The pressure of the spring L on the clamps forces the polishing-blocks carried by the clamp-plates into contact with the work. Provision may be made, by a spring-catch or clamp-screw or other suitable device, for retaining the segment D and its attachments in place in the pulley C while revolving, but in practice I have not found such devices necessary, since the work resists any centrifugal tendency, and the rolls $b\ b''$ are preferably so located that there is barely room for the segment to pass between them, and consequently the interval of time in which the segment passes beyond the control of the one until it reaches the other is immaterial, and if the segment was thrown outward slightly during such interval it would be forced back to proper position by the roll $b''$.

The cleaning, polishing, or burnishing blocks E E' may be of any suitable arrangement or construction. Thus they may be of wood faced with cloth, leather, or other suitable fabric, saturated with crocus or other suitable material, or they may be of solid emery, carborundum, or other suitable cutting, abrading, or polishing substances.

When the segment D and the clamp-plates and blocks are removed from the pulley, the clamps $g\ g'$ would shut up under the influence of the spring L and thus render the introduction of the clamp-plates troublesome; but I prevent this trouble by causing the stop $n$ to intervene between the ends $o\ o'$ of the clamps $g\ g'$ when the segment and the clamp-plates are withdrawn. For this purpose the stop $n$ is provided with the spring $p$, which forces the stop $n$ inward when the segment is withdrawn and which holds the clamps separated to such a degree that the segment and its clamp-plates and polishing-blocks are readily reintroduced. The clamp-plates and blocks press upon the stop and hold it outward, but when they are removed the spring $p$ forces the stop inward until it comes between the ends $o\ o'$ of the clamps $g\ g'$ before the clamp-plates have been entirely removed, and so prevents the collapsing against each other of the clamps $g\ g'$ under the influence of the spring L. It will readily be understood that this result may be secured in various different ways, but in the construction shown the stop $n$ is provided with a recess, in which is fitted the spring $p$, which forces the stop inward when the clamp-plates are drawn out of the pulley. The stop $n$ is guided by pins $q$, inserted in a plate $r$, interposed above the spring L and secured in place by a screw $s$, Fig. 3, which also holds the spring at its center. Any other suitable arrangement may be adopted.

The manner of using my improved polishing-machine will have been understood from the preceding description. The operator by removing the segment D and the polishing devices E E' can introduce any rod or structure which he desires to polish into the machine, and then, having replaced the polishing devices and the segment in the pulley in proper engagement with the rod, the operation will proceed on applying the power. He has then only to turn on the power to set the pulley C to revolving and to shift his work laterally through it to secure the desired result, be it grinding, abrading, cleaning, polishing, burnishing, or buffing, according to the requirements of the work, to which he has adapted his polishing device.

The method of using my improved polishing-machine and the useful object of such use will have been already understood, but it will be obvious that many modifications of the particular construction described may be adopted without departure from the principles involved in my invention.

It will also be understood that the means of revolving the polishing-pulley may be varied, that the belt may be omitted, and the pulley driven by the friction of one of the rolls or other devices adopted for this purpose.

I claim—

1. The herein-described polishing apparatus, consisting of a revolving pulley having a removable segment carrying a centrally-located spring-actuated polishing device, substantially as described.

2. The combination with the pulley, of the removable segment, the clamp-plates pivoted to the segment, the clamps pivoted to the pulley, the polishing devices, and a spring located inside the pulley, substantially as described.

3. The combination with the pulley C, of the removable segment D, the clamp-plates $ff'$, the polishing devices E E', a suitable spring inside the pulley, and the supporting-rolls $b\ b'\ b''$, substantially as described.

4. The combination with the pulley C, of the removable segment D, the clamp-plates $ff'$, the polishing devices E E', a suitable spring inside the pulley, the supporting-rolls $b\ b'\ b''$ and the belt $a$, substantially as described.

5. The combination with the pulley C, of the removable segment D, the clamp-plates $ff'$ pivoted to the segment, the clamps $g\ g'$, the polishing devices E E', a suitable spring inside the pulley, the supporting-rolls $b\ b'\ b''$, and the belt $a$, substantially as described.

6. The combination with the pulley having a removable segment carrying polishing devices, of a suitable spring within the pulley, and means for preventing lateral movement of the polishing devices, substantially as described.

7. The combination with the pulley C, of the removable segment D, the clamp-plates $ff'$ pivoted thereto and provided with the flanges $l\ l'$, the clamps $g\ g'$ pivoted to the pulley and provided with the flanges $j\ j'$, the polishing devices E E', and the spring L, substantially as described.

8. The combination with the pulley C, having removable segment D, of the polishing devices supported inside the pulley, a suitable spring, the standard A having arms J J', the rolls $b\ b'\ b''$ and belt $a$, substantially as described.

9. The combination with the pulley C, the removable segment D, the clamp-plates $ff'$ pivoted to the segment, the clamps $g\ g'$ pivoted to the pulley, the curved spring L attached to the inside of the pulley at its center and bearing by its ends on the outside of the clamps, the movable stop $n$, and spring $p$, substantially as described.

JOHN A. HOULIHAN.

Witnesses:
GEO. B. SELDEN,
C. G. CRANNELL.